April 19, 1960     L. C. CUNNIFF ET AL     2,933,094
PICKLING BATH INSTRUMENTATION Filed Aug. 26, 1958     3 Sheets-Sheet 1

INVENTORS
Leo C. Cunniff &
Robert Rosenthal
BY
Charles H. Brown
ATTORNEY

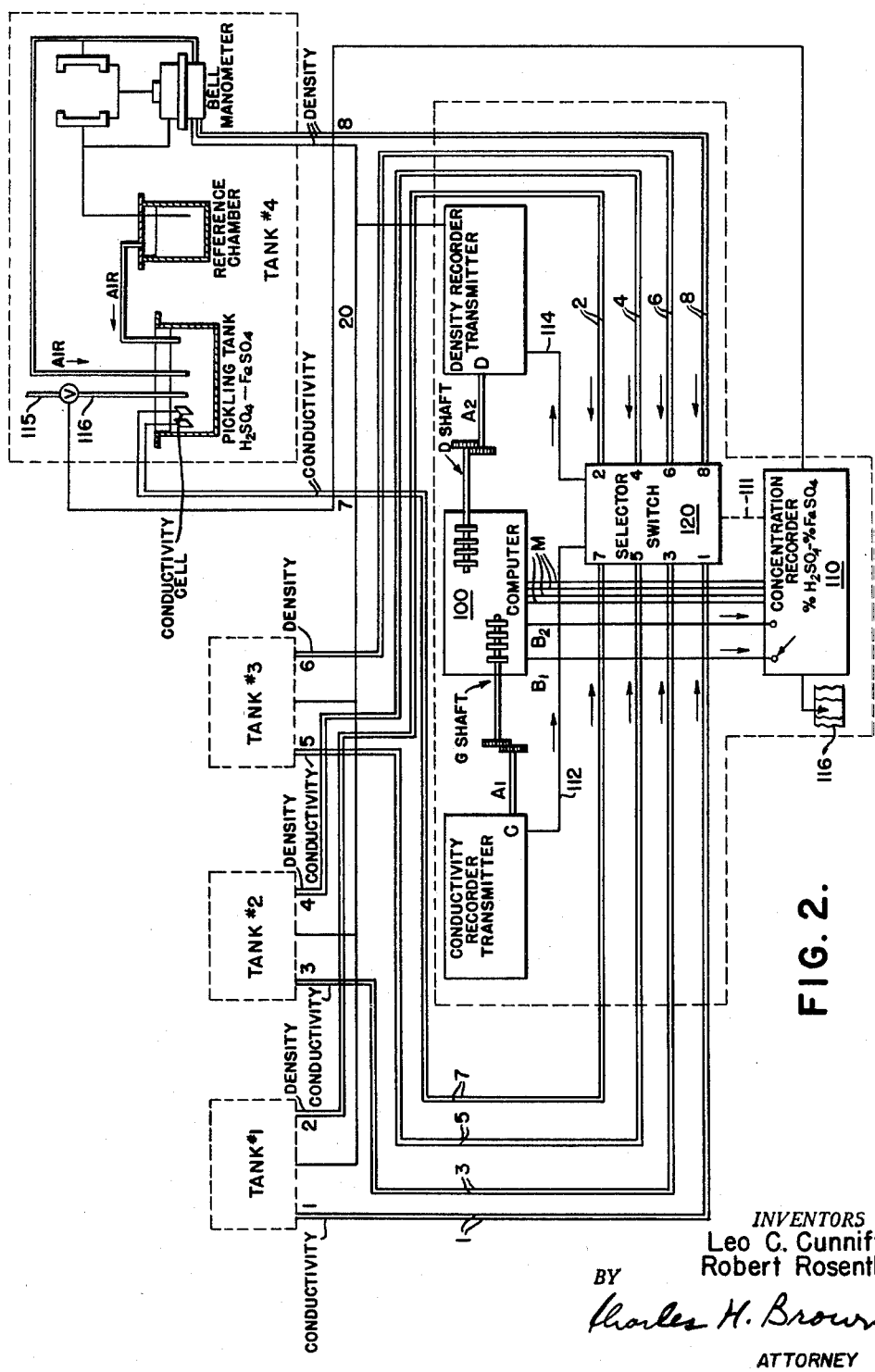

INVENTORS
Leo C. Cunniff &
Robert Rosenthal
BY
Charles H. Brown
ATTORNEY

United States Patent Office 2,933,094
Patented Apr. 19, 1960

2,933,094

PICKLING BATH INSTRUMENTATION

Leo C. Cunniff, Cedar Grove, and Robert Rosenthal, Tenafly, N.J., assignors to Industrial Instruments, Inc., Cedar Grove, N.J., a corporation of New Jersey Application August 26, 1958, Serial No. 757,294

12 Claims. (Cl. 137—4)

This invention relates to a method of and apparatus for continually measuring the weight percentages of both the sulphuric acid and ferrous sulphate concentrations in a pickling tank or bath.

As is known, pickling tanks or baths are used to remove substantially all traces of iron oxides, sludge, sand and other contaminants from iron or steel surfaces before applying coatings of tin, zinc or other metallic protective substances. The pickling bath may comprise, for example, dilute sulphuric acid.

When iron or steel is immersed in dilute sulphuric acid, the oxides of iron comprising the mill scale go into solution. The principal chemical reaction which occurs is the formation of ferrous sulphate. There is usually an optimum concentration of acid for most efficient reaction between the acid and the iron oxide. Since the acid is continually used up in the reaction, it is necessary to replenish it from time to time. Also, with continued use, the concentration of ferrous sulphate and other soluble reaction products builds up in the liquid. Finally, the ferrous sulphate concentration becomes so high that the bath becomes inefficient for further use and must be completely replaced with fresh ingredients.

To run the pickling bath at its highest efficiency it is necessary to maintain the acid concentration within a fairly narrow range. It is thus necessary to have some means of controlling the concentration accurately. One way in which the concentration has been ascertained in the past involved taking frequent samples of the bath as the pickling process proceeds, carrying the samples to the analytical laboratory, and determining the acid concentration by titration against standard alkali. This, however, is a slow and tedious method requiring trained chemists, and it is not continuous. Since there is also a maximum concentration of ferrous sulphate for efficient action of the acid on the metal, it is also necessary to determine the ferrous sulphate concentration periodically in order to find out when the danger point has been reached. Hitherto, the ferrous sulphate concentration has also been determined by relatively slow chemical methods, such as titration. Because this method used in the past for analyzing pickling baths has been slow and discontinuous, information about the condition of the bath has always lagged behind actual usage and the operator has had no way of finding out what the condition of the bath was at a given instant, until considerable time had passed.

An object of the invention is to enable the automatic and periodic but continual control of the acid and ferrous sulphate concentrations of a plurality of tanks or baths.

Another object is to simultaneously and continually indicate automatically the acid and ferrous sulphate concentrations of a pickling bath or tank as functions of electrolytic conductivity and specific gravity.

Still another object is to enable the automatic and continual monitoring of a plurality of chemical concentrations in one or more pickling bath compositions.

The present invention, in one aspect, provides an automatic method of and means for quickly and efficiently obtaining a reading of the acid concentration and ferrous sulphate concentration of a pickling bath without requiring any manual operation on the part of the operator. Stated another way, the invention auotmatically and continually measures both the changing specific gravity (density) and electrolytic conductivity in the pickling bath or tank. These two variables are fed into a computer, which performs certain mathematical functions and provides two outputs, one of them the weight percentage of ferrous sulphate, and the other weight percentage of sulphuric acid. The computer is provided with a plurality of slidewires or rheostats each designed to provide a characteristic of resistance in ohms (ordinate) versus rotation (abscissa) which is derived from a four-scale nomograph and related to the shape and configuration of the four scales on the nomograph. The two outputs from the computer are alternately fed into a concentration recorder which indicates the acid and ferrous sulphate concentrations. If desired, these two outputs from the computer may be utilized to automatically maintain the two concentrations in the bath or tank at required levels for most efficient operation. Broadly stated, the apparatus of the invention measures two physical quantities, density and conductivity, and translates these along the path of a previously determined mathematical or geometrical relationship, such as a four-line nomograph, into two chemical concentrations representing ferrous sulphate and sulphuric acid.

A more detailed description of the invention follows, in conjunction with a drawing, wherein Figure 1 is a pickling acid nomogram containing four line scales representing density (specific gravity), ferrous sulphate ($FeSO_4$), electrolytic conductivity and sulphuric acid ($H_2SO_4$), the values and arrangement of which are utilizable in the determination of the acid and ferrous sulphate concentrations of a pickling bath composition, from a knowledge of the density and conductivity of the solution;

Figure 2 illustrates one embodiment of the invention containing apparatus for automatically and continually monitoring the acid and ferrous sulphate concentrations of a plurality of pickling tanks or baths;

Figure 1:
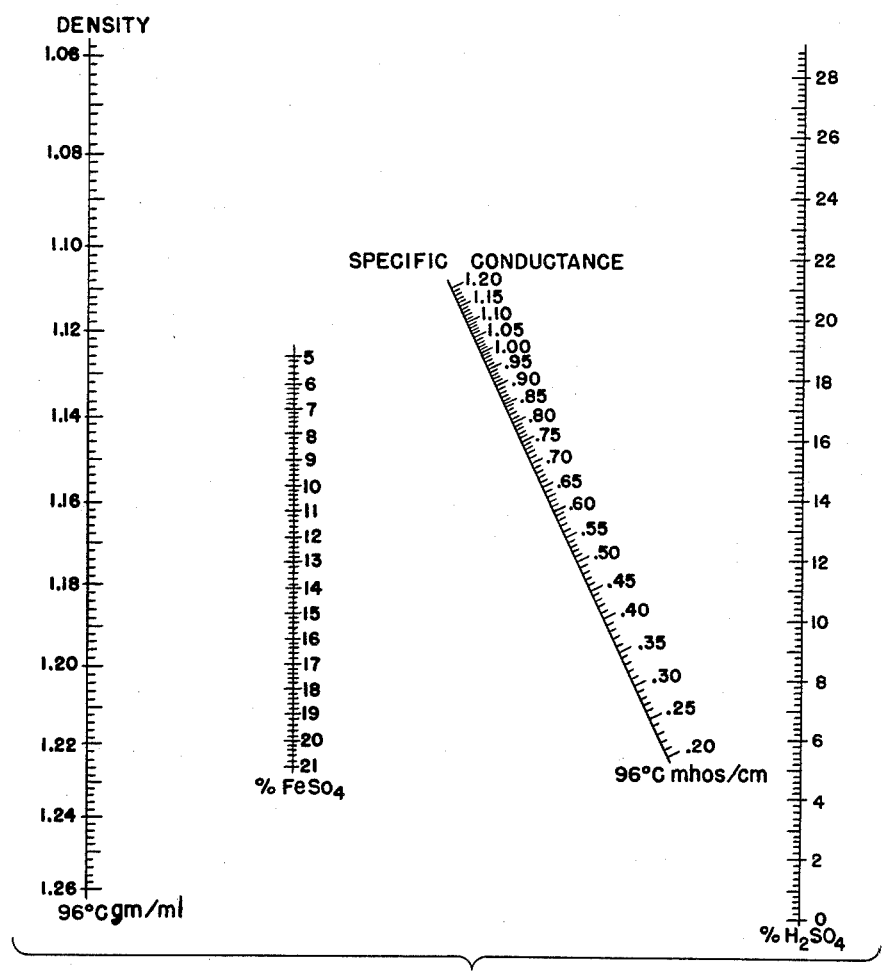

In Figure 1, there are shown four scales which, reading from left to right are respectively: Specific gravity of the pickling bath, weight percentage of ferrous sulphate ($FeSO_4$) in the pickling bath, specific conductance of the pickling bath in mho/centimeters, and sulphuric acid ($H_2SO_4$) concentration in the pickling bath in weight percentage. The scale of weight percentage sulphuric acid is arranged so that a direct reading upon it can be obtained by taking a reading of specific gravity and specific conductance. A direct reading of weight percentage ferrous sulphate can be obtained in the same manner. The specific gravity of the bath can be measured by a simple float method. The specific conductance of the bath can be measured by filling a unit conductance cell with a sample of the bath and making conductance readings with the aid of a Wheatstone bridge, all readings being taken at a specific temperature. With a knowledge of both the specific gravity and specific conductances, both the ferrous sulphate and the sulphuric acid concentration are obtainable by laying a straight edge across the scales such that it intersects all four scales, with the straight edge aligned with the readings representing specific gravity and specific conductance. The intersection of the straight edge with the ferrous sulphate and sulphuric acid scales gives directly these concentrations.

The present invention illustrated in the system of Fig. 2 performs the function of the monogram of Fig. 1 automatically, quickly, and with a high degree of accuracy, and eliminates the foregoing manual operations involving the nomograph and achieves an automatic reading and control of the sulphuric acid and ferrous sulphate concentrations.

In Fig. 2 there are shown four tanks labeled 1 to 4, each containing a pickling bath. These tanks are illustrative of any number of tanks to be monitored or controlled, the different tanks having different sulphuric acid concentrations. In practice, in the use of the pickling line system of Fig. 2 in a steel mill, the steel strips will pass by means of a suitable conveyer from one tank to the next succeeding tank. Each pickling tank has coupled to the bath thereof both a conductivity cell for measuring the conductivity of the bath and a bell manometer for measuring the density of the bath. In the interest of simplification of the drawing, only the details of tank number 4 have been shown (note also Fig. 4), although it should be understood that each of the other three tanks has similar apparatus coupled thereto for measuring the conductivity and density. By means of the invention, the sulphuric acid and ferrous sulphate concentrations in each tank are successively monitored to enable the operator to know at a glance whether to add more sulphuric acid or to discard (dump) the entire solution in a particular tank if the ferrous sulphate concentration builds up too high for efficient operation.

The information contained on the nomograph of Fig. 1 is reduced to a number of equations. An analog computer 100 (shown in more detail in Fig. 5) is composed of two self-balancing AC bridges (viz: an outer bridge O and an inner bridge I), having special function slidewires or rheostats. Each slidewire is designed to provide a characteristic of resistance in ohms versus rotation which is derived from the nomograph and related to the shape and configurations of the scales on the nomograph. Input to the computer 100 is provided by two shafts D and G the rotations of which correspond to density and conductivity. Computer 100 performs the necessary mathematical operations on these two inputs and furnishes two outputs on leads B1 and B2 which are in terms of sulphuric acid and ferrous sulphate concentration and control a concentration recorder 110. This recorder 110 is a self-balancing potentiometer type having an amplifier and a motor. The concentration recorder 110 is switched from one computer bridge to the other, via leads B1 and B2, and produces separate readings on a chart 116. The chart may be a strip of paper recording in different colored inks both the acid concentration and the ferrous sulphate concentration. This strip chart recorder includes the conventional rotary multi-point switches which step from point to point as a function of time, each step occupying so many seconds per point. Also connected between the computer 100 and the concentration recorder 110 are four wires M three of which connect two linear slide wires physically located in the concentration recorder to other slide wires physically located in the computer. The fourth wire is common. These wires M are shown in more detail in Figure 5.

Coupled to input shaft G of the computer 100 is a drive shaft A1 which is controlled by conductivity recorder transmitter C. Coupled to input shaft D of computer 100 is a drive shaft A2 which is controlled by density recorder transmitter D.

Figure 3:
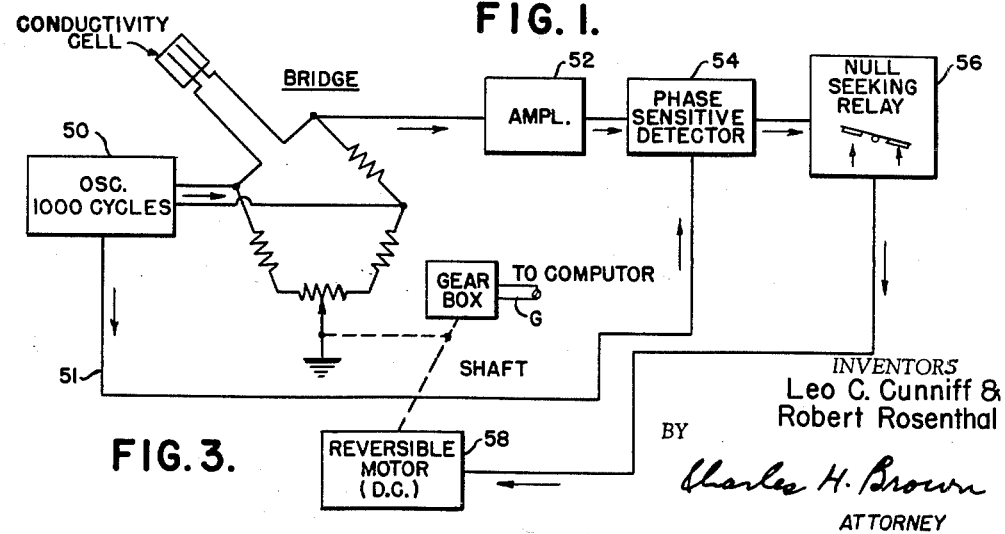
Figure 3 illustrates diagrammatically the components of the conductivity recorder of Figure 2.

Conductivity recorder C is a conventional AC Wheatstone bridge, self-balancing type instrument in which the output of the conductivity bridge is fed through an amplifier A and drives a motor M which rebalances the bridge and at the same time positions the G shaft of the computer as a function of the conductivity of the solution being measured. By way of example only, Fig. 3 shows one suitable type of conductivity recorder which may be utilized. Density recorder D is also conventional, and is an inductance bridge recorder of the null-balance type. Recorder D is also provided with an amplifier A and motor M which, when rebalancing the bridge, causes shaft D of the computer 100 to take up a position proportional to density (note Fig. 5).

Selector switching mechanism 120 serves to switch both the conductivity recorder C and the density recorder D to the different tanks or pickling baths in succession. This switch is shown as having eight terminal connections 1 to 8, each of which is coupled to a pair of correspondingly identified leads extending to the different tanks. Terminals 1, 3, 5 and 7 of the switch 120 are coupled respectively to the conductivity cells of tanks 1, 2, 3 and 4. Terminals 2, 4, 6 and 8 of the switch 120 are coupled respectively to the bell manometers of tanks 1, 2, 3 and 4. Selector switch 120 switches conductivity cell and density measuring leads from the appropriate tanks in prearranged sequence to the conductivity and density recorders C and D. The selector switch is programmed by a timing device in the concentration recorder 110 over dash line mechanical connection 111. Both leads of each conductivity cells are switched by the selector switch. The bell manometer switch used in the density measuring system for each tank has three leads, one identified as 20 being common to all tanks, and the other two of which are switched in synchronism with the switching of the conductivity cell leads. The selector switch cycles periodically, for example, once every two minutes, thus enabling each tank to be monitored for thirty seconds (½ minute). The time duration between steps or switching operations of the selector switch 120 is sufficiently long to permit the conductivity and density recorder transmitters to rebalance. Such selector switches are well known in the art and can be supplied as part of the concentration recorder in which, in practice, it is physically positioned. Once source of supply is the Minneapolis-Honeywell Corporation.

Figure 5:
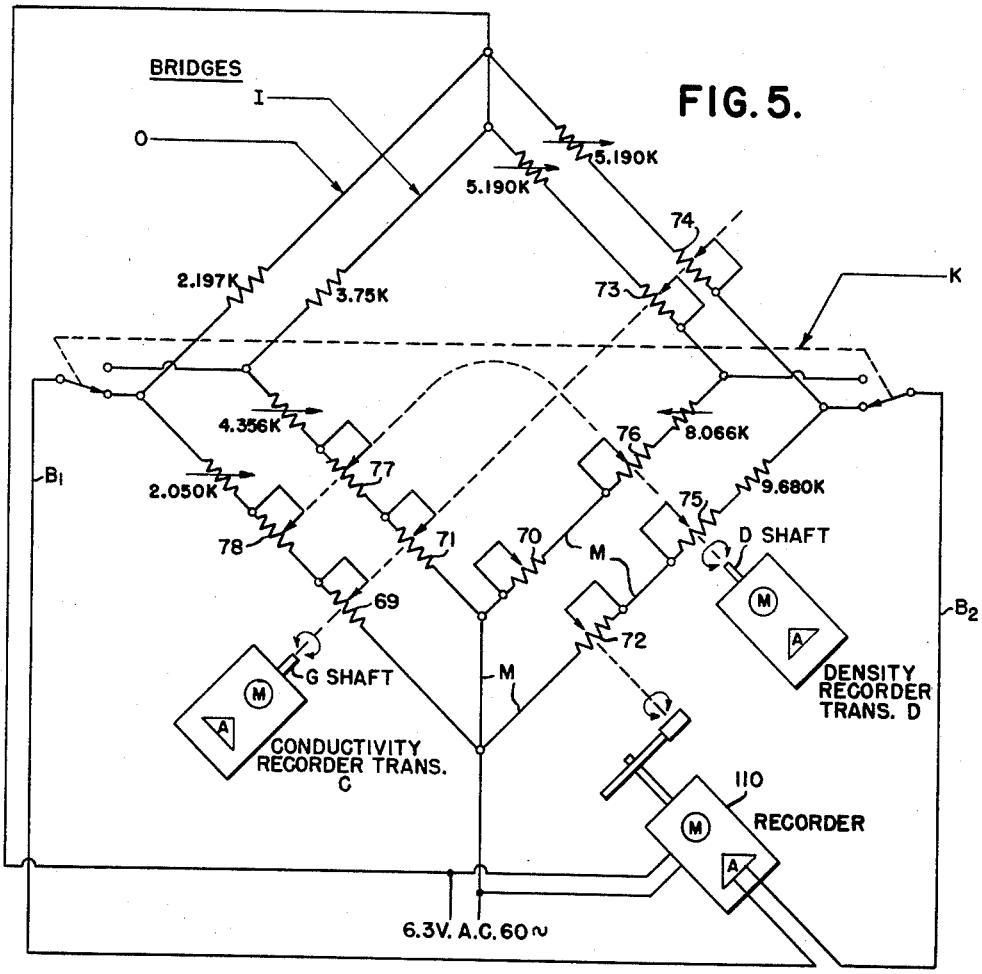
Figure 5 illustrates diagrammatically the bridge circuits of the analog computer of Figure 2.

The operation of the system of Figure 2 will now be given. Let it be assumed that the conditions in tank number 1 are being measured or monitored. The conductivity cell of tank 1 will be connected to conductivity recorder transmitter C over leads 1, terminal 1 of switch 120, and lead 112. The bell manometer of tank 1 will be connected to density recorder transmitter D over leads 2, terminal 2 of switch 120, and lead 114. The directions of the arrows indicate the directions of information flow. The conductivity recorder transmitter C measures the conductivity of tank 1 and positions the shaft G as it rebalances. At the same time, the density recorder transmitter D causes the D shaft to take up a position proportional to the density of the solution in tank 1. The two shaft inputs G and D to the computer rotate a number of linear and function slidewires or potentiometers in the two bridges O and I of computer 100 as shown in Fig. 5.

The two bridges O and I in the computer 100 have their respective output leads B1 and B2 switched to the concentration recorder 110 by switch K (see Fig. 5) in synchronism by the action of selector switch 120. For example, while selector switch 120 is positioned for taking measurements from tank 1, the self-balancing concentration recorder 110 is connected to inner computing bridge I, reads the sulphuric acid concentration output, and rebalances the acid concentration bridge in the computer 100. The concentration recorder 110 then prints on a chart 116 the weight percentage of $H_2SO_4$. The concentration recorder 110 is then switched to outer computing bridge O, reads the ferrous sulphate concentration output and rebalances the ferrous sulphate concentration bridge in the computer 100, and then prints the weight percentage of $FeSO_4$ on chart 116. The output motor of the concentration recorder 110 rebalances each of the two bridges in the computer 100 in sequence, making the computer a true null balance device. After this sequence, the concentration recorder advances the selector switch to the next tank to be measured, for example tank number 2. When the selector switch goes to tank number 2, it connects conductivity leads 3 and density leads 4 to the conductivity and density recorder transmitters C and D respectively. As before, the concentration recorder 110 is switched betwen the two computing bridges O and I of computer 100 during the 30 second interval that switch 120 allots to the monitoring of tank 2. In similar manner, tanks 3 and 4 are monitored.

A more detailed description of certain components used in the system of the invention will now be given with reference to Figs. 3, 4 and 5.

Fig. 3 is one type of conductivity recorder for measuring the conductivity of a solution, which may be used for the conductivity recorder transmitter C of Fig. 2. A self-balancing Wheatstone bridge circuit is illustrated containing four arms of which one is the conductivity cell adapted to be immersed in the solution the conductivity of which is to be measured. Alternating current is supplied to one diagonal of the bridge by an oscillator 50 furnishing 1000 cycles. This oscillator also supplies the same A.C. output over lead 51 to a phase sensitive detector 54. Output from the bridge is taken off the other diagonal of the bridge and also fed to the phase detector through an amplifier 52. Any unbalance in the bridge caused by a change in resistance in the conductivity cell will produce a D.C. output from the phase detector 54 of such polarity and magnitude as to operate the null seeking relay 56 and cause the reversible D.C. motor 58 to move its shaft to rebalance the bridge. As the shaft of the motor moves, it produces rotation of the shaft coupled to the computer as a function of the conductivity of the solution being measured.

Figure 4:
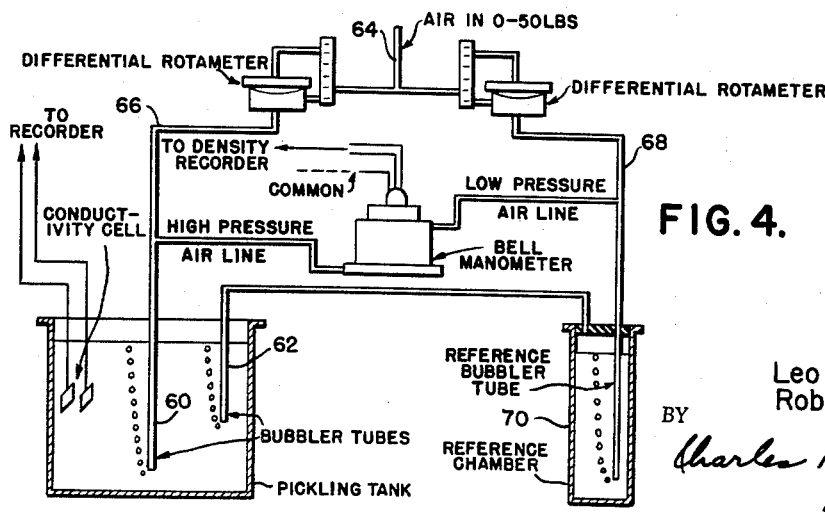
Figure 4 illustrates diagrammatically the components associated with each of the tanks of Figure 2, and, in detail, the bell manometer used to measure the specific gravity of the solution in a tank.

Fig. 4 illustrates a known apparatus for measuring the density or specific gravity of a solution. This density measuring apparatus makes use of two bubbler tubes 60 and 62 immersed to different depths in the pickling tank solution with their open bottom ends a fixed distance apart. Air is fed into the system from tube 64. The two differential rotameters set up a prescribed rate of air flow into two branches 66 and 68. Branch 66 at the left of Fig. 4 goes into the longer bubbler tube 60. The other branch at the right of Fig. 4 goes to the shorter bubbler tube 62. The reference chamber 70 and thence to the shorter bubbler tube 62. The reference chamber contains a non-volatile liquid such as butyl phthalate and simply introduces a fixed pressure drop and is used for zero suppression, that is, it suppresses the lower portion of the density range in the region of zero density which is of no interest in the present application. The bell manometer is a differential pressure measuring device. Since the spacing between the bottom ends of the two bubbler tubes 60 and 62 is held constant and since the rate at which air is urged through the bubbler tubes is constant, changes in differential pressure as measured by the bell manometer will be directly proportional to density. This bell manometer is a standard commercially available device having inductance coils and a mercury chamber. The inductance of the coils, manifested by the movement of a core inside a coil, varies as the mercury rises and falls in its chamber. This change in inductance is translated into an electrical signal and fed to the density recorder transmitter.

Fig. 5 illustrates the details of the analog computer which consists of two self-balancing A.C. bridges—viz, an outer bridge O for measuring ferrous sulphate concentration and an inner bridge I for measuring sulphuric acid concentration. Each bridge contains four resistor arms in three of which are special function slidewires. The values of the fixed resistors and the values for resistance versus rotation function of the slidewires are determined by the range of acid and ferrous sulphate concentration, by temperature and other factors relating to the conditions in the pickling line. Across one diagonal of the bridges there is connected an A.C. source of 60 cycles 6.3 volts. Outputs from the bridges are taken from the other diagonals.

The conductivity recorder transmitter C, the density recorder transmitter D and the concentration recorder 110 a self-balancing Brown recorder) are shown linked to the bridge arms of the computer. The G shaft of conductivity recorder transmitter C is linked to slidewires 69, 71, 73 and 74 of the two bridges O and I, while the D shaft of density recorder transmitter D is linked to slidewires 75, 76, 77 and 78 of the two bridges O and I. The transfer switch K is used to automatically but alternately connect the outputs from the two computer bridges to the concentration recorder 110, via leads B1 and B2. This switch K as well as the switching of the selector switch 120, Fig. 2, which connects the C and D recorders to the proper density and conductivity sensing elements in the different tanks in proper sequence is all done physically in the output of the concentration recorder, and on a fixed time interval.

In the operation of Fig. 5, let it be assumed that conditions in a pickling tank have remained stable and that both computing bridges O and I of computer 100 are in balance. Under these conditions no movement of either the G or D shafts will take place, or the output shaft of the concentration recorder 110 linked to slidewires 70 and 72. Now let it be assumed that conditions change in the pickling tank being monitored which cause both a change in conductivity and density. When this happens, the conductivity and density recorder transmitters C and D respectively will each have input signals supplied thereto which, in turn, cause the G and D shafts to the computer to rotate, thereby repositioning the slidewires in the two bridges O and I. An unbalance voltage from these two bridges, representing their respective outputs, will supply input signals to the concentration recorder 110, in succession. This unbalance signal causes the output shaft of the concentration recorder to reposition slidewires 70 and 72 in such a direction as to restore bridge balance. In addition to repositioning slidewires 70 and 72, a recording pen and an indicator is also positioned in the concentration recorder, and the visual indication of this pen on chart 116 (Fig. 2) is the output of the system.

In one embodiment of the invention successfully used, the slidewires 70 and 72 of the computer were located physically within the concentration recorder 110, although electrically coupled to the other slidewires of the computer 100 as shown in Fig. 5. In this embodiment, the computer 100 did not exist as a separate box because the four slidewires 69, 71, 73 and 74 of the computing bridges connected to the G shaft were physically located in the conductivity recorder transmitter C while the four slidewires 75, 76, 77 and 78 linked to the D shaft were physically located in the density recorder transmitter D.

Although an analog computer has been mentioned, it should be understood that the invention is not limited to the use of this computer since any suitable type of computer can be employed.

If desired, in addition to recording the output of the system on chart 116, or in place thereof, the output of the concentration recorder can be made to actuate valves in known manner to maintain the sulphuric acid and ferrous sulphate concentrations in the tanks at the required or desired levels for most efficient operation. One such arrangement is shown in Fig. 2 wherein the output of concentration recorder 110 appearing on connection 113 is used to control a valve V associated with tank 4, in order to add concentrated sulphuric acid to tank 4 when demanded by the concentration recorder. The sulphuric acid is supplied to the valve by a pipe 115 and then via pipe 116 to the tank. Further, if desired, the switching operation of the concentration recorder during each switching position when connected to a particular tank can be eliminated by employing two output recorders to replace the single concentration recorder. In such event, each of these two recorders would individually print on its own chart and be individually connected to the computer, and both recorders would have their respective slidewires linked to the slidewires of the computer bridges.

What is claimed is:

1. The method of measuring the sulphuric acid and ferrous sulphate concentrations in a pickling solution, comprising the steps of measuring the conductivity and density of the solution, translating the conductivity and density measurements into separate movements which are functions of the conductivity and density of the solution being measured, translating the movements into two voltages representing chemical concentrations in weight percentage of sulphuric acid and ferrous sulphate as a function of a predetermined mathematical relationship, and visually indicating the values of these two voltages.

2. The method of measuring the sulphuric acid and ferrous sulphate concentrations in a pickling solution, comprising the steps of measuring the conductivity and density of the solution, translating the conductivity and density measurements into separate rotary movements which are functions of the conductivity and density of the solution being measured, translating the rotary movements into two voltages representing chemical concentrations in weight percentage of sulphuric acid and ferrous sulphate as a function of a predetermined mathematical relationship, and visually indicating the values of these two voltages.

3. In a system for the measurement of pickling acid concentration, a tank adapted to contain a solution including sulphuric acid, a conductivity measuring apparatus and a density measuring apparatus, said conductivity apparatus including a conductivity cell in said tank and a Wheatstone bridge type recorder of the self-balancing type coupled to said cell, said recorder having an output indicative of conductivity, said density measuring apparatus including a bridge recorder of the null-balance type, said last recorder having an output indicative of density, and a computer coupled to the outputs of said recorders, said computer having two outputs indicative of sulphuric acid and ferrous sulfate concentrations, and means controlled by said two outputs.

4. In a system for the measurement of pickling acid concentration, a tank containing a solution substantially comprising sulphuric acid and ferrous sulfate, a conductivity measuring apparatus and a density measuring apparatus, said conductivity apparatus including a conductivity cell in said tank and a Wheatstone bridge type recorder of the self-balancing type coupled to said cell, said density measuring apparatus including a bridge recorder of the null-balance type, each of said recorders including a motor, a shaft for each motor, said recorders providing outputs in the form of shaft rotations, and a computer having individual self-balancing electrical bridges each having slidewires coupled to said shafts, said slidewires providing a desired characteristic of resistance in ohms versus rotation, said computer having two outputs one of which represents weight percentage of sulphuric acid and the other of which represents weight percentage of ferrous sulphate, and concentration recording means coupled to said two outputs from the computer.

5. A system as defined in claim 4, including means for switching said concentration recorder from one of said outputs to the other, said concentration recorder having a motor for rebalancing each of two electrical bridges in said computer in sequence, said concentration recorder also including a chart and means for printing on said chart the separate outputs from said computer.

6. A system as defined in claim 5, wherein said computer is an analog computer which provides voltages on its two outputs, said concentration recorder being responsive to said voltages to print on said chart recordings corresponding to chemical concentrations representative of the voltages on the outputs from said computer.

7. In a system for the measurement of pickling acid concentrations comprising a plurality of tanks, each tank containing a solution including sulphuric acid and ferrous sulfate, a conductivity cell in each tank, a density measuring apparatus for each tank; a common conductivity recorder transmitter adapted to be coupled to the cells in the different tanks in prearranged sequence, a common density recorder transmitter adapted to be coupled to the density measuring apparatus in each tank in prearranged sequence, a common computer coupled to the conductivity recorder transmitter and the density recorder transmitter, and a selector switch for switching the conductivity recorder transmitter and the density recorder transmitter to the conductivity cell and density measuring apparatus associated with one tank and then in succession to the corersponding elements of the other tanks, each recorder transmitter being of the rebalancing type, means for causing said selector switch to cycle periodically and to remain in each switching position for a time interval sufficient to permit the conductivity recorder transmitter and the density recorder transmitter to rebalance, said computer having two outputs providing voltage values representative of sulphuric acid and ferrous sulphate concentrations, and means coupled to and responsive to said two outputs.

8. A system as defined in claim 7 wherein the conductivity recorder transmitter and the density recorder transmitter provide separate outputs in the form of shaft rotations, the positions of the shafts being respectively proportional to conductivity and density, said computer comprising two electrical bridges including slidewires coupled to said shafts and controlled thereby, an output for each bridge in the computer, one bridge output of the computer providing a voltage representing weight percentage of sulphuric acid, while the other bridge output of the computer provides a voltage representing weight percentage of ferrous sulphate.

9. The method of measuring the sulphuric acid and ferrous sulphate concentrations in a pickling solution, comprising the steps of measuring the conductivity and density of the solution, and translating the conductivity and density measurements along the paths of a predetermined mathematical and geometrical relationship into electrical signals representing two chemical concentrations representing weight percentage of sulphuric acid and ferrous sulphate, and utilizing said signals to maintain said acid concentration at a desired level in said solution.

10. The method of controlling the acid concentration in a tank containing a pickling solution which includes the steps of measuring the conductivity and density of the solution, translating the conductivity and density measurements into separate movements which are functions of the conductivity and density of the solution being measured, translating the movements into two voltages representing chemical concentrations in weight percentage of sulphuric acid and ferrous sulphate as a function of a predetermined mathematical relationship, and adding acid to said bath as a function of said signals.

11. A system in accordance with claim 3, wherein said means controlled by said computer is a self-balancing recorder, and a valve for adding acid to said tank coupled to and controlled by said last self-balancing recorder.

12. In a system for the control of pickling acid concentration, a tank adapted to contain a solution including sulphuric acid, a valve for adding acid to said tank, a conductivity measuring apparatus and a density measuring apparatus, said conductivity apparatus including a conductivity cell in said tank and a Wheatstone bridge type circuit of the self-balancing type coupled to said cell, said density measuring apparatus including a bridge circuit of the null-balance type coupled to a manometer, each of said measuring apparatuses including a motor and a shaft for the motor, said measuring apparatuses providing outputs in the form of shaft rotations indicative of conductivity and density, respectively, and a computer having individual self-balancing electrical bridges each having slidewires coupled to said shafts, said slidewires providing a desired characteristic of resistance in ohms versus rotation, said computer having two outputs indicative of sulphuric acid and ferrous sulfate concentrations, and means coupled to and controlled by at least one of said two outputs from the computer for actuating said valve.

No references cited.